C. Seimel,
Soldering Machine.
No 83,100.   Patented Oct. 13, 1868.
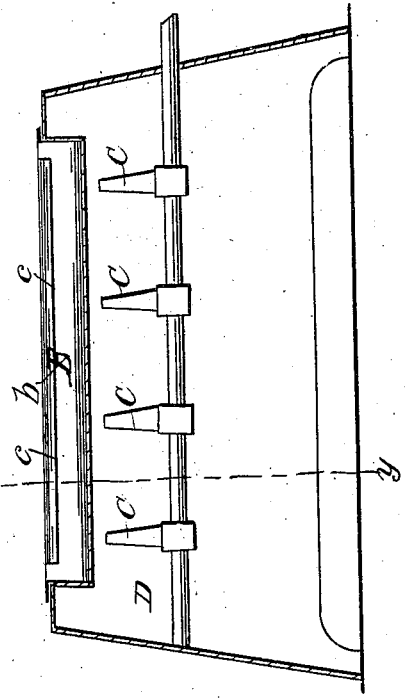
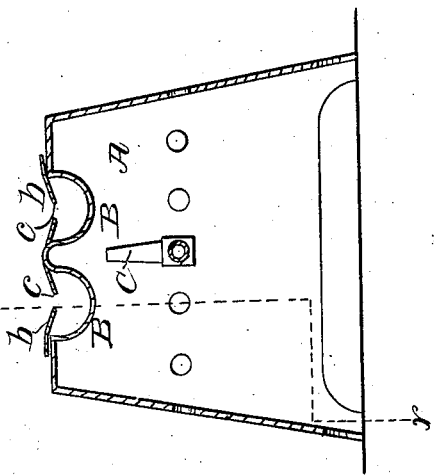
Witnesses:
James H. Gridley.
F. C. Beach.
Inventor:
Conrad Seimel
by Munn & Co.
Attorneys

CONRAD SEIMEL, OF GREEN POINT, NEW YORK.

Letters Patent No. 83,100, dated October 13, 1868.

IMPROVEMENT IN SOLDERING-VESSELS.

The Schedule referred to in these Letters Patent and making part of the same.

*To all whom it may concern:*

Be it known that I, CONRAD SEIMEL, of Green Point, in the county of Kings, and State of New York, have invented a new and useful Improvement in Soldering-Furnaces; and I do hereby declare the following to be a full, clear, and exact description of the same, sufficient to enable others skilled in the art to which the invention appertains to fully understand and use it, reference being had to the accompanying drawings, forming part of this specification, and in which—

Figure 1 is a transverse vertical section, and

Figure 2 is a longitudinal vertical section.

This invention consists in a mechanism in which solder may be heated, provided with an arrangement for supporting vessels in a convenient position for applying solder, the whole being an improvement upon an invention of mine for which an application for Letters Patent is now pending.

In the drawings, A represents a sheet-metal stand, of any size suitable to the purpose of heating solder and applying it to cans or other like articles. A pipe, D, is placed longitudinally of the stand, at a convenient distance below the top, said pipe being a gas-conductor, and provided with a number of spouts, C, projecting upward, for the purpose of discharging flame against the under side of the troughs B B, set in the top of the stand A, and removable therefrom at pleasure.

The troughs B are intended to contain solder during the process of melting under the action of the aforesaid gas-flame, and also during the process of applying it, while in a fluid condition, to the articles it is placed upon. To effect this latter object, shelves *b b* are secured to the upper edges of each trough, which project inward, and are inclined downward, leaving spaces *c c* between their inner edges, wide enough to allow the corners of cans, or other like articles supported upon the shelves *b*, to extend down into the melted solder below.

In my former invention, above referred to, there was but one trough, B, instead of two, as in my present invention. The advantages attendant upon the employment of two troughs instead of one, are, First, the same quantity of gas serves for two troughs that must needs be employed for one. A double effect is consequently performed by the fuel.

Second, when fresh solder is added, it need be applied to but one trough at a time, the other being kept, meanwhile, in a condition for use, the effect of putting in fresh solder being to chill that previously in the trough, so that if there is but one trough, the operator is compelled to wait till the whole becomes heated.

By using two troughs, no time may be lost, which, in the employment of one trough, amounts to fully one-third, thus saving one-third the cost of time, as well as one-half the cost of fuel or gas.

Having thus described my invention,

What I claim as new, and desire to secure by Letters Patent, is—

1. The stand A, in combination with the troughs B B and the gas-apparatus C, as herein described, for the purpose specified.

2. The troughs B, in combination with the shelves *b*, as and for the purpose set forth.

The above specification of my invention signed by me, this 21st day of August, 1868.

CONRAD SEIMEL.

Witnesses:
FRANK BLOCKLEY,
S. C. KEMON.